United States Patent
Alonso et al.

(12) United States Patent (10) Patent No.: US 6,434,700 B1
Alonso et al. (45) Date of Patent: Aug. 13, 2002

(54) AUTHENTICATION AND AUTHORIZATION MECHANISMS FOR FORTEZZA PASSWORDS

(75) Inventors: Oscar S. Alonso, Westminster; John S. Calabrese, Mission Viejo; Herbert C. Morris, Hawthorne; Rodelito L. Victa, El Toro, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/218,730

(22) Filed: Dec. 22, 1998

(51) Int. Cl.[7] .................................................. G06F 1/26
(52) U.S. Cl. ...................... 713/169; 713/168; 713/170; 713/176; 713/182
(58) Field of Search ................................ 713/168–169, 713/170, 176, 182

(56) References Cited

U.S. PATENT DOCUMENTS

| | | | |
|---|---|---|---|
| 5,872,847 A | * 2/1999 | Boyle et al. | 380/25 |
| 5,946,399 A | * 8/1999 | Kitaj et al. | 380/49 |
| 6,067,620 A | * 5/2000 | Holden et al. | 713/155 |
| 6,094,485 A | * 7/2000 | Weinstein et al. | 380/30 |

* cited by examiner

Primary Examiner—Thomas R. Peeso
(74) Attorney, Agent, or Firm—Hickman Palermo Troung & Becker LLP (57) ABSTRACT

A method and apparatus that provide network access control are disclosed. In one embodiment, a network access control apparatus is configured to receive and authenticate a password that uses the "Fortezza" cryptographic protocol, and to receive and authenticate passwords of other types, to thereby selectively permit a client associated with the Fortezza password to access a protected network. A Fortezza card reader is coupled to the client and associated with a Fortezza card that contains the Fortezza password. A network access server is logically coupled to the client. An access control server is coupled logically between the client and the protected network and that controls access of the client to the protected network. A Fortezza authentication server is coupled to the access control server for communication therewith. A database is coupled to the access control server and that contains profile information associated with the user. The access control server receives, from the client, user access information associated with a particular user of the client; determining, based on the user access information and a database, a type of a password associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

15 Claims, 5 Drawing Sheets

AUTHENTICATION AND AUTHORIZATION MECHANISMS FOR FORTEZZA PASSWORDS

FIELD OF THE INVENTION

The present invention generally relates to management of computer networks, and relates more specifically to network access control mechanisms that authenticate and authorize users of passwords generated by the Fortezza cryptographic protocol.

BACKGROUND OF THE INVENTION

By remote network access, individuals or large groups may work with computers and networks from any location and at any time. Remote access is the ability to connect to, or "log-on" to a computer network from a distant location. Using remote access, mobile computer users, or computer users at remote sites, may access a network by dialing in to a network access server ("NAS") using a computer, modem and remote access software. The NAS selectively permits or denies network traffic and thereby controls remote access to an Internet Service Provider, private corporate network or virtual private network.

However, the convenience of remote access comes at the expense of security. A malicious user can use remote access to penetrate and attack a network. For example, an unauthorized user can gain remote access to a machine with the intention of destroying, compromising, or stealing resources or information. Thus, one important security issue for remote access is user identification and authentication, which is verifying that the person who dials in is authorized to access the network and is who he says he is.

Another important security issue is user authorization. Generally, after authentication of a user, an authorization phase begins. Authorization is the process of defining what an authenticated user can do when the user accesses the network. For example, a network administrator may restrict remote users to specific servers and services, rather than letting them access any part of the network. In general, the more authorization a user receives, the more stringent the authorization procedure would be.

Remote access security systems vary in complexity depending on the level of security needed. Some networks rely on simple user identifier ("ID") and password systems. In such a system, the NAS maintains user IDs and encrypted passwords as part of a system configuration file. However, there are at least two major drawbacks to this approach. The first drawback is that remote users need the flexibility of dialing in to the NAS that is closest to their location, while still being able to use the same user ID and password. The second drawback of the user ID and password system is that its security derives only from controlled knowledge of the password. Any Identification and Authentication (I&A) mechanism based solely on "something you know" is considered weak authentication.

Strong authentication, on the other hand, is achieved through an I&A mechanism based on "something you know" as well as "something you have." An example of "something you have" that may be used to improve authentication is ownership of a Smart card, Token card or Crypto card.

A Fortezza security system is an example of strong authentication. Fortezza security systems require each authorized user to possess an electronic card that can generate or is encoded with a password generated using the Fortezza cryptographic algorithm (a "Fortezza Crypto card"). The United States National Security Agency developed the Fortezza security system for the United States Department of Defense, to provide originator authentication as well as data integrity and data privacy.

Generally, a Fortezza security system includes a Fortezza Crypto card that stores unique encrypted information, and which executes encryption algorithms to produce a scrambled one-time password ("OTP"). The card is a self-contained hardware system, having its own CPU and memory, and which stores and authenticates Fortezza OTPs. Each OTP is unique and is valid only for a particular interval of time. Because each password created by this process is different every time, users cannot share their passwords, and intruders cannot reuse a stolen password. Further information about Fortezza security systems is disclosed in Fortezza Application Developer's Guide, available on the Internet at: http://armadillo.huntsville.al.us/FADG/welcome.htm While the Fortezza security system provides a high level of security, in the past it has been difficult to deploy. Deployment of Fortezza depends on setting up a sophisticated infrastructure to support Fortezza's specialized hardware and interface specifications.

In one approach, users access a network by dialing in to special NASs that are dedicated to support Fortezza technology exclusively. These special NASs are not configured to support any other authentication and authorization mechanism other than Fortezza. A different set of NASs are maintained to support the other authentication and authorization mechanisms that are not only less specialized than Fortezza but typically involve lower user access privileges corresponding to weaker authentication and authorization. Thus, an Internet Service Provider, corporate network, or virtual private network would need to maintain several security systems in order to support users with different password types.

Figure 1:
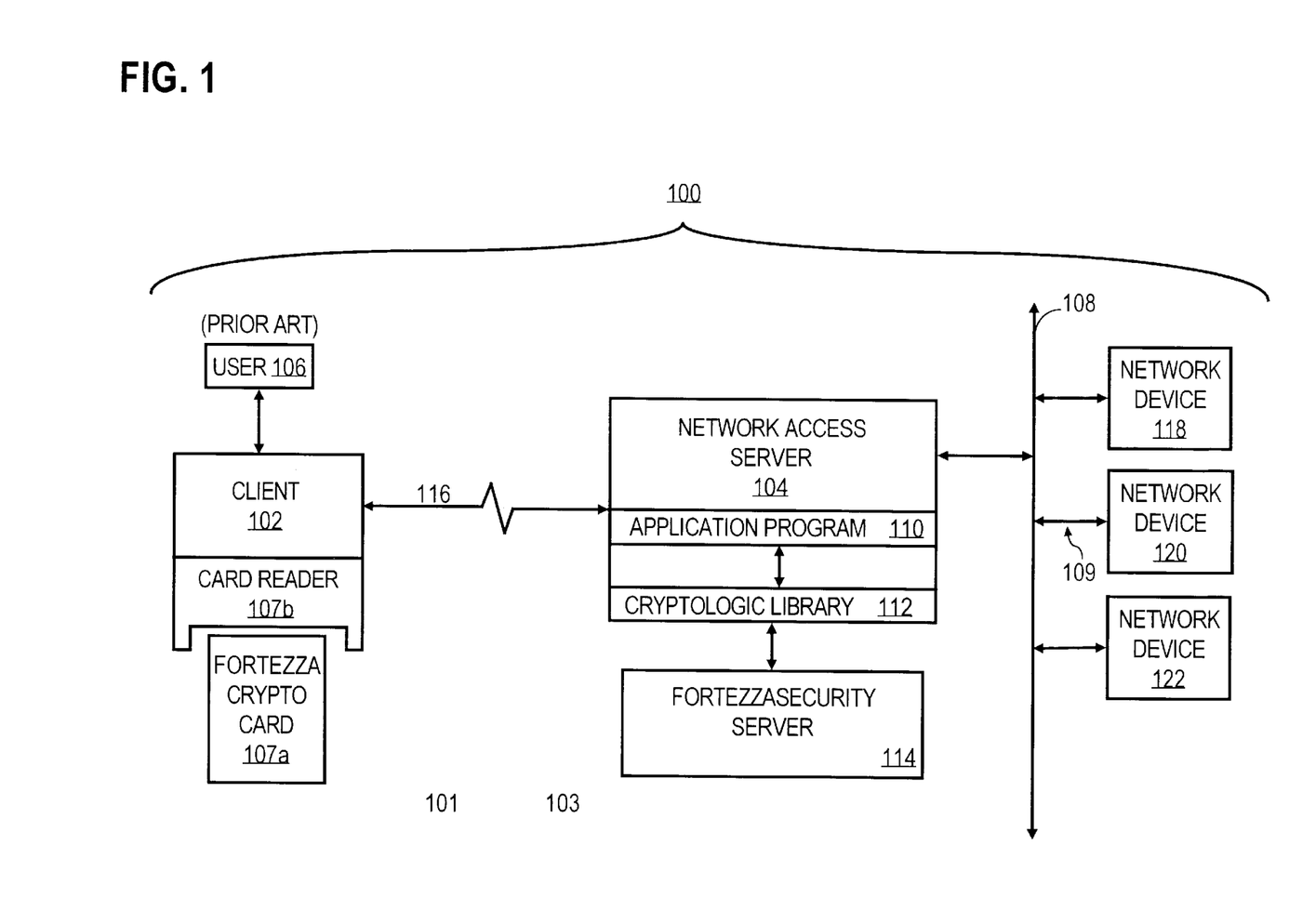
FIG. 1 is a block diagram of a Fortezza security system.

FIG. 1 is a block diagram of a system 100 in which the Fortezza security system can be used. Generally, system 100 includes a client 102, a user 106 associated with client 102, a network access server 104, and a network 108. Client 102 is used by and associated with a user 106. Client 102 and network access server 104 are respectively located in logically distinct regions 101, 103, which may be geographically separate.

Client 102 is a device, such as a workstation or personal computer, that is capable of dialing in to the network access server 104 to establish a connection 116. Client 102 may be a Sun workstation running Solaris. A card reader 107b is coupled to client 102 to communicate data and commands between the client and a Fortezza card 107a. In an embodiment, card reader 107b is a PCMCIA card reader such as Litronic ARGUS/2100, and Fortezza card 107a is a compatible PCMCIA card. Card reader 107b may communicate with client 102 over a SCSI port.

The network 108 is a network that includes any number of network devices 118, 120, 122 interconnected by one or more communication channels 109. Ethernet, Token Ring, or other protocols can characterize the communication channels 109. Communication channels 109 may form part of a local area network or wide area network.

The network access server 104 is a computer, or one or more hardware or software components or processes that cooperate or execute in one or more computer systems. The network access server 104 is coupled to the network 108 and controls remote access to the network 108 and the network devices 118, 120, 122. An example of a product that is suitable for use as network access server 104 is model AS5300, commercially available from Cisco Systems, Inc.

The network access server 104 may execute an application program 110 that is compiled and linked with a cryptologic library 112. The application program 110 invokes the functions in the cryptologic library 112. The cyptologic library communicates with a Fortezza security server 114. Thus, cryptologic library 112 provides an interface that enables network access server 104 to communicate with Fortezza security server 114.

Fortezza security server 114 is a computer, or one or more hardware and software components or processes that cooperate or execute in one or more computer systems. While Fortezza is a hardware-based authentication method, the electronic hardware that carries out Fortezza authentication may be controlled by software elements that command the hardware what to do, provide input data, and receive output data. Fortezza products that are suitable for use as cryptologic library 112 and Fortezza security server 114 are commercially available from Secure Computing Inc., Litronic Inc., and Rainbow Technologies Inc.

The user 106 associated with client 102 causes the client to establish a connection 116. For example, user 106 may enter user access information such as a valid username and password at a login window displayed by client 102, and by inserting a Fortezza Crypto card 107a into a Fortezza card reader 107b. One or more application programs executed by Client 102 receive the user access information. When inserted in the Fortezza card reader 107b, the Fortezza Crypto card 107a may perform a mathematical hash algorithm on the user access information, to produce a one-time password that is unique for every login. The one-time password may be stored in the form of a hash value. Client 102 sends the user access information and the hash value to network access server 104 over connection 116.

Upon receiving the hash value through connection 116, network access server 104 forwards the hash value to application program 110. The application program 110 may invoke appropriate functions in the cryptologic library 112, which in turn communicates the hash value and user access information to Fortezza server 114. Based on the hash value, the Fortezza server 114 determines if the user 106 is authorized to access the network 108 and what set of access privileges the user 106 is allowed to obtain.

The drawback is that the network access server 104 can only support Fortezza passwords. Separate network access servers are maintained to support other types of passwords. Thus, in a computer network that supports users of different password types, many different NASs need to be maintained to implement different security systems, thereby complicating the task of network administration. When a user deploys a system secured by Fortezza, the user must also procure another product or system to carry out authorization of services.

This arrangement is also inconvenient because a particular user may have multiple passwords and may require multiple password technologies to access different resources of the network.

Further, currently available Fortezza systems do not enable an administrator to manage user name and password information in a database such as a relational database management system (RDBMS).

Based on the foregoing, there is a clear need for a mechanism allowing users of Fortezza passwords to use computer networks in conjunction with other authentication and authorization mechanisms, thereby facilitating ease of network administration.

In particular, there is a need for a mechanism that can receive and authenticate Fortezza passwords within a system that also receives and authenticates other types of passwords for users who do not use Fortezza passwords or crypto cards.

SUMMARY OF THE INVENTION

The foregoing needs, and other needs and objects that will become apparent for the following description, are achieved in the present invention, which comprises, in one aspect, a method of receiving and authenticating a Fortezza password within a computer system that also receives and authenticates passwords of other types and to thereby selectively permit a client associated with the Fortezza password to access a network that is protected by the computer system, comprising the steps of receiving, from the client, user access information associated with a particular user of the client; determining, based on the user access information and a database that contains profile information associated with the user, a type of a password associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

According to one feature of this aspect, receiving the user access information comprises the step of receiving from the client, user access information associated with a particular user of the client at an access control server that is logically interposed between the client and the network. In another feature, the method further involves the step of receiving, from the client, user access information associated with a particular user of the client at a network access server that is coupled to the access control server and logically interposed between the client and the network.

According to still another feature, the step of determining the password type further involves the step of accessing a user profile that is stored in the database and that stores profile information of a plurality of users, in which the profile information identifies users of FORTEZZA type passwords and passwords of other types.

In another feature, the step of requesting authentication and authorization from the Fortezza server further involves the step of communicating with the Fortezza server through a cryptologic library.

According to another aspect, a password authentication apparatus is configured to receive and authenticate a Fortezza password and to receive and authenticate passwords of other types, to thereby selectively permit a client associated with the Fortezza password to access a protected network. An access control server logically interposed between the client and the protected network. A Fortezza authentication server is coupled to the access control server for communication therewith. A database coupled to the access control server and that contains profile information associated with the user. Means for generating the Fortezza password are coupled to the client. There are means in the access control server for receiving, from the client, user access information associated with a particular user of the client; determining, based on the user access information and a database, a type of a password associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

One feature of this aspect involves a means in the access control server for receiving, from the client user, access information associated with a particular user of the client at a network access server that is coupled to the access control server and logically interposed between the client and the network. Another feature of this aspect involves a means in the access control server for determining the password type by accessing a user profile that is stored in the database and that stores profile information of a plurality of users, in which the profile information identifies users of FORTEZZA type passwords and passwords of other types.

Yet another feature is a means in the access control server for requesting authentication and authorization from the Fortezza server which further comprises a cryptologic library in the access control server that is logically coupled to the Fortezza server for communication therewith.

Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for allowing users of Fortezza passwords to use computer networks with other authentication and authorization mechanisms is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

In one embodiment of the invention, a client sends a message containing user access information to a network access server ("NAS"), requesting that a connection be established. Upon receiving the request, the network access server sends the user access information to a centralized server, such as an Access Control Server ("ACS").

The ACS provides a central point of control for the management of multiple security services, and network devices. The ACS determines who may access the network, what services they are authorized to use, and to whom the services are to be charged and for how much. Thus, the ACS provides Authorization, Authentication, and Accounting ("AAA") functions for a managed network.

The ACS may be used simultaneously with dial-up NASs, routers and firewalls. Each of the network devices can be configured to communicate with the ACS. Thus, the ACS can be used as a central server to manage and control access to network devices. For example, different groups of network managers having different authorization privileges with respect to the network devices, can simultaneously manage security services from multiple locations. An example of an ACS is CiscoSecure™ ACS 2.2 for UNIX, commercially available from Cisco Systems, Inc.

The ACS integrates and supports various authentication and authorization technologies, including token cards, and Fortezza security systems. The ACS may communicate with a relational database to simplify the storage of user and group profile information against which users are authenticated. The user or group profile information may include authentication information to validate identity and authorization information to determine what parts of the internal network and services a user or group can access. In addition, accounting information related to what the user has done or is doing can be stored in the relational database for billing and security auditing. The ACS allows system administrators to use a variety of authentication mechanisms with varying degrees of authorization privileges.

In one embodiment, the system is integrated with a service provider that has multiple points of presence ("POP"), so that there is an ACS at each of the major POPs. A NAS is able to authenticate and authorize users by communicating with the ACS that is logically or physically closest to the NAS.

USING FORTEZZA PASSWORDS IN A SYSTEM THAT SUPPORTS OTHER AUTHENTICATION MECHANISMS

1. OVERVIEW OF ARCHITECTURE

Figure 2:
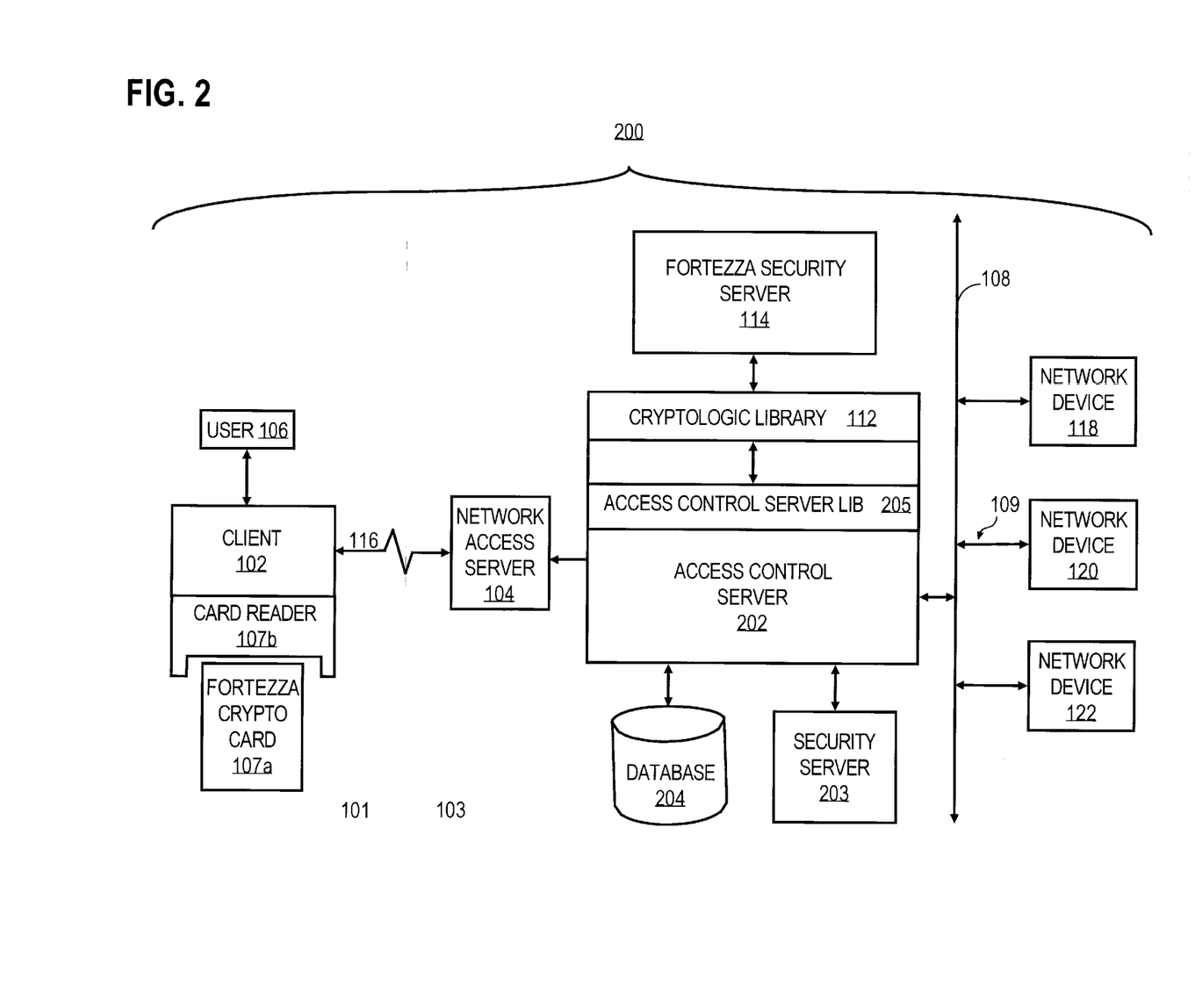
FIG. 2 is a block diagram of a system for authenticating Fortezza passwords in a network environment, according to an embodiment.

FIG. 2 is a block diagram of a system 200 in which the invention can be implemented. System 200 may include a user 106, client 102, Fortezza card 107a, Fortezza card reader 107b, connection 116, and network access server 104 at regions 101, 103 in a configuration similar to that of system 100 of FIG. 1. Also like system 100 of FIG. 1, system 200 of FIG. 2 is configured to protect and allow selective access to network devices 118, 120, 122 of network 108. In addition, system 200 may have an Access Control Server 202, a relational database 204, and a non-Fortezza specific security server 203.

As shown in FIG. 2, in the preferred embodiment, Access Control Server 202 is coupled logically between network access server 104 and network 108 to thereby selectively control communications between client 102 and the network. Access Control Server 202 may execute an application program that provides user authentication functions to network access server 104 upon request. An example of a commercial product suitable for use as Access Control Server 202 is CiscoSecure ACS version 2.2.2, from Cisco Systems, Inc.

Access Control Server 202 also has access control server library 205, which communicates with a cryptologic library 112. The access control server library 205 is a collection of precompiled software modules. For example, access control server library 205 may call functions of cryptologic library 112 to carry out functions relating to Fortezza passwords.

Fortezza server 114 is coupled logically to cryptologic library 112, which may call the Fortezza server to carry out functions relating to processing Fortezza passwords. For example, access control server library 205 may call functions of cryptologic library 112, which in turn may send requests to or receive responses from Fortezza server 114 in order to carry out the functions that are called. The functions may be called through an application programming interface (API).

Hardware elements of Fortezza security server 114 may reside in the same physical computer as access control server 202. A computer that runs Sun's Solaris operating system is suitable to serve as access control server 202, but the Solaris platform is not required. An example of a suitable computer configuration is: Sparc 20, 167 MHz, 256 MB RAM, running Solaris version 2.5.1 or 2.6.

A database 204 and a security server 203 are coupled to Access Control Server 202. The database may store user or group profile information as well as accounting information related to use of the computer network. The security server 203 may authorize and authenticate non-Fortezza specific passwords. Examples of commercial database systems that are suitable for use as database 204 include Oracle RDBMS version 7.3.2 or later, and Sybase RDBMS version 11.2 or later.

In an alternate embodiment, Access Control Server 202 may be coupled only to network access server 104, and network 108 may be coupled to the network access server so that the network access server is logically interposed between client 102 and the network. In the alternate configuration, Access Control Server 202 may interact with the network access server to determine when the network access server may give client 102 access to network 108.

Database 204 stores a profile of each user who is authorized to use network 108 and who may be authenticated by access control server 202. The profile is a set of values that collectively define the rights and privileges of the user. Access control server 202 also provides a command line interface that is augmented to enable an administrator to specify that the type of password used by a particular user is Fortezza. In the preferred embodiment, access control server 202 provides a command line interface that accepts an "add user profile" command having the syntax AddProfile [-ht host]-p port [-id client]{-u user |-g group}[-pr parent-group][-pw password-pair][-a profile-info][-q]

where "-pw" is either a password type value, or a password type value combined with a password specification. The "-pw" parameter defines which passwords to add to the user's profile. Password types that require a password specification include "clear", "ARAP", "PAP", "DES", "String", and "Outbound PAP." When the user is to use a password type that does not require a password specification, such as Fortezza, then only the type is entered, for example, -pw FORTEZZA In response, the access control server 202 adds the user profile to database 204. Alternatively, a user with a Fortezza password may be added database 204 using functions available in a graphical user interface provided by the access control server 202.

Advantageously, in this configuration, access control server 202 can authenticate Fortezza passwords as well as passwords of many other types, all in an integrated server. A separate ACS dedicated to Fortezza is not required. Accordingly, the system is simpler than past approaches, more easily maintained, and more versatile.

In addition, the Fortezza passwords are maintained in a database along with user profile information for users who are associated with passwords of many different types. This advance enables a network administrator to manage Fortezza password users far more easily and efficiently than in the past.

2. LOGICAL RELATIONSHIP OF FORTEZZA ELEMENTS

Figure 4:
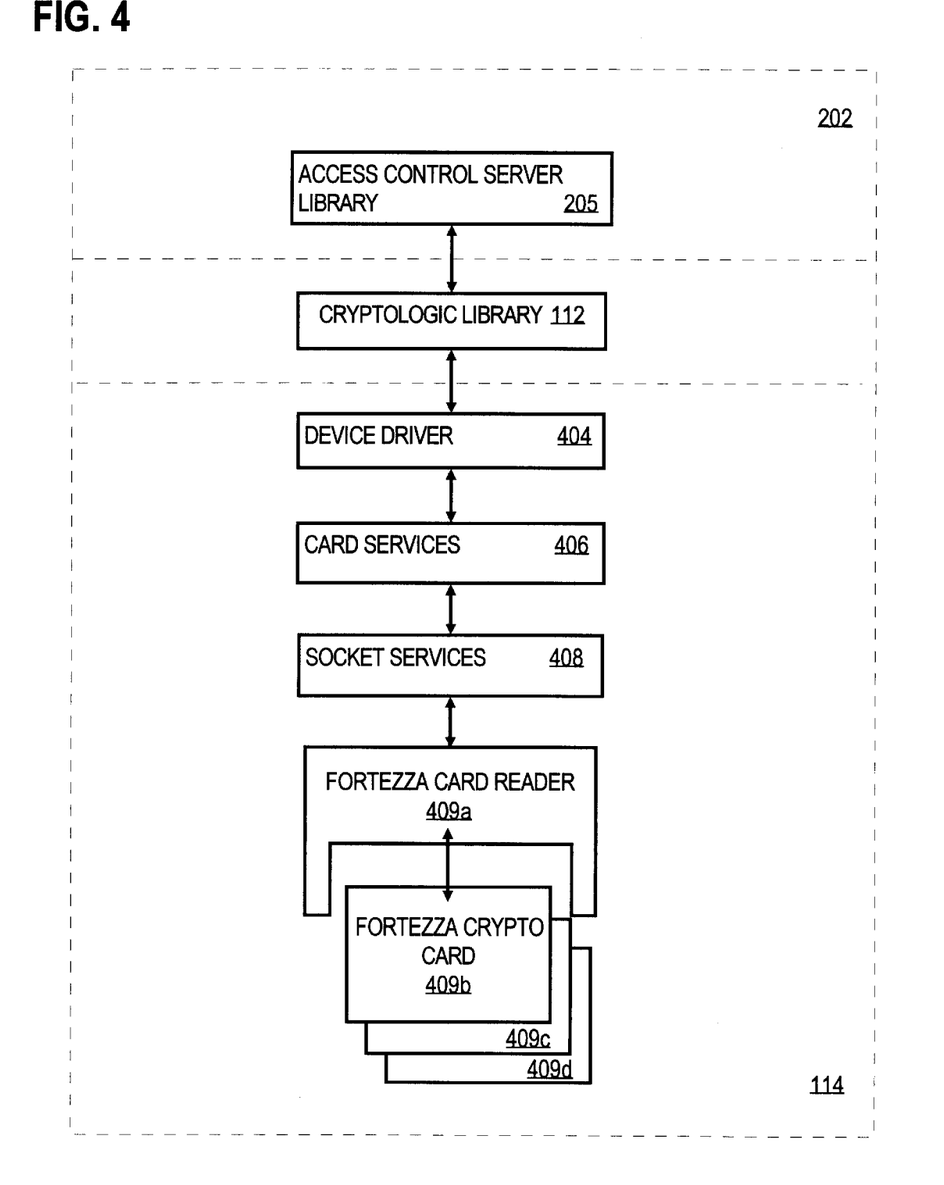
FIG. 4 is a block diagram illustrating a logical hierarchy of software and hardware elements associated with a Fortezza security server, card reader, and card.

FIG. 4 is a block diagram illustrating a logical relationship of elements of FIG. 2 that are involved in processing Fortezza passwords, according to an embodiment. Part of FIG. 4 is what was referred to as the Fortezza server 114, shown in greater detail here.

Access control server library 205, executed by Access Control Server 202, may invoke functions of the cryptologic library 112, which is thus depicted in FIG. 4 as immediately logically below the access control server library. The cryptologic library 112 provides the access control server library 205 with a software interface to the Fortezza Crypto card's functions while abstracting the specific data formats, protocols, and the Fortezza Crypto card interface requirements.

At the next lower logical layer is device driver 404. The device driver 404 provides cryptographic library 112 with an interface to the lower logical layers. The device driver 404 is operating system independent.

Logically below device driver 404 is card services 406, which allocates and controls operating system and hardware resources for the Fortezza Crypto card. Card services 406 preferably is a software element that carries out functions that include directing power requirements, resetting the hardware device that connects to the Fortezza Crypto card, reading card configuration information, and performing reads and writes from and to the Fortezza Crypto card's memory.

Socket services layer 408 provides a software interface between the host computer, typically the same computer as the ACS, and the hardware used to manage the Fortezza Crypto card. Socket services 408 is responsible for detecting interrupts from the Fortezza Crypto card, setting power levels, and mapping the Fortezza Crypto card memory to a specific area of memory available in the host.

At the lowest logical levels are the Fortezza card reader 409a and the Fortezza Crypto cards 409b, 409c, 409d. Typically, Fortezza card reader 409a is configured to read any number of Fortezza Crypto cards, 409b, 409c, 409d. Fortezza card reader 409a may also include an adaptor comprising hardware, such as an integrated circuit, that communicates with the Fortezza Crypto cards 409b, 409c, 409d. Alternatively, the adaptor may reside within the host, for example, on its motherboard. The Fortezza card reader 409a transmits data to and from the Fortezza Crypto cards 409b, 409c, 409d. Fortezza Crypto cards 409b, 409c, 409d read data from the host, processes it, then, make the data available to the host.

3. METHOD OF USE

Figure 3:
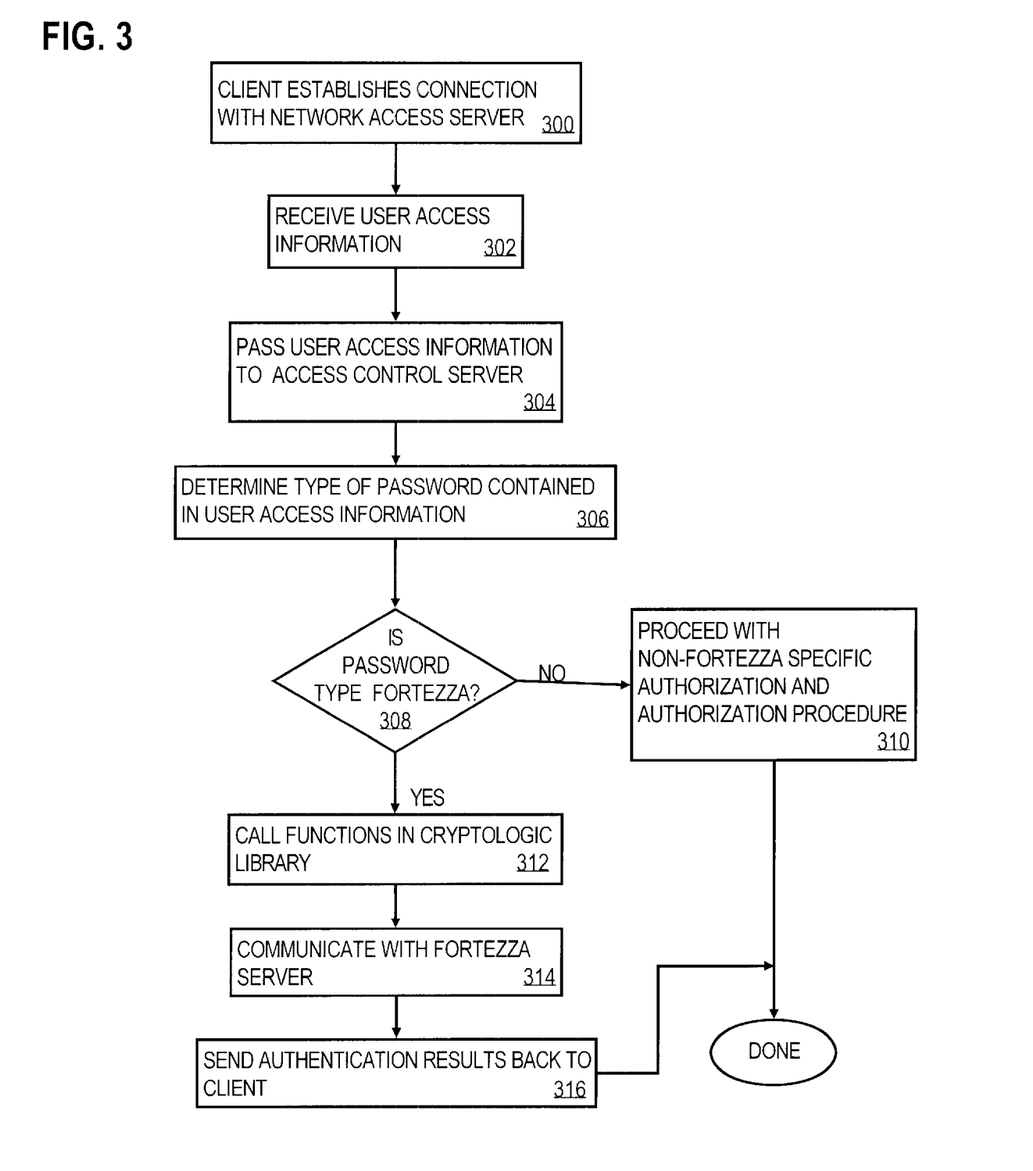
FIG. 3 is a flow diagram of one embodiment of a method for allowing users of Fortezza passwords to use computer networks supporting a variety of authentication and authorization technologies.

FIG. 3 is a flow diagram of one embodiment of a method for allowing users of Fortezza passwords to use computer networks supporting a variety of authentication and authorization technologies. FIG. 3 will be explained with reference to the components in FIG. 2. However, the method of FIG. 3 may be implemented with any other arrangement of hardware and software elements that may carry out the functions needed in the method of FIG. 3. Thus, the method of FIG. 3 is not intended to be limited to the context of FIG. 2.

At block 300 of FIG. 3, client 102 establishes a connection 116 with the network access server 104. For example, user 106 associated with client 102 causes the client 102 to dial in and send user access information to the network access server 104. The user access information typically contains a username and password. The password can be a fixed password or an OTP type password obtained through the use of a Smart card or Token card, depending on the level of authentication. The password type can also be a Fortezza password which is a unique hash value produced by a Fortezza Crypto card 107a and Fortezza card reader 107b. The more authorization privileges a user receives, the stronger the authentication would be.

At block 302, the network access server 104 receives user access information from client 102.

In system 200, the communications function of accessing the network, and the structure that supports this function, are separated from the security functions and the structure that carries them out. Hence, at block 304, the network access server 104 passes the user access information to the Access Control Server 202. The network access server 104 controls modems and ports that are used to connect to network 108, but does not examine the type of password contained in the user access information. It simply forwards the user access information to the Access Control Server 202 which is a point of centralized control of network access and the provision security services.

At block 306, the Access Control Server 202 determines the type of password that is contained in the user access information. The database 204 stores user or group profiles containing authentication and authorization information for each user or group. Based on the profile, and the user identifier that is contained in the user access information, the Access Control Server 202 finds a user profile in the database 204 that corresponds to the user. The Access Control Server 202 then is able to determine the type of password the user access information contains.

At block 308, if it is determined that the password is a Fortezza password, then control passes to block 312. Otherwise control passes to block 310. At block 310, the Access Control Server 202 invokes the appropriate server when, for example, a token card authentication is required. For example, at block 310, Access Control Server 202 may invoke security server 203 to authenticate a token card.

At block 312, the Access Control Server 202 invokes the access control server library that in turn invokes functions in the cryptologic library 112. The cryptologic library 112 communicates with the Fortezza server 114 and acts as an intermediary between access control server 202 and Fortezza server 114. An example of a suitable cryptologic library is LOCKOut Fortezza Unix Host version 1.2, available from Secure Computing, Inc. In an embodiment, an AAA server portion of the access control server 202 communicates with LockOut Fortezza using an agreed-upon API.

The Fortezza server 114 authenticates the password received from the user access information, and in block 316 sends a message indicating whether the password is valid or not. In one embodiment, if the password is not valid, the Fortezza server may send a message, requesting user 106 to try again.

Thus, a system and method permit a user of a Fortezza password to gain access to a network through the same network access server and access control server that serve users who have other types of passwords. For example, the system and method may be used in an environment in which passwords of users are authenticated using SafeWord AS, Security Dynamics' Ace one-time-password server, and other authentication mechanisms as well as Fortezza.

HARDWARE OVERVIEW

Figure 5:
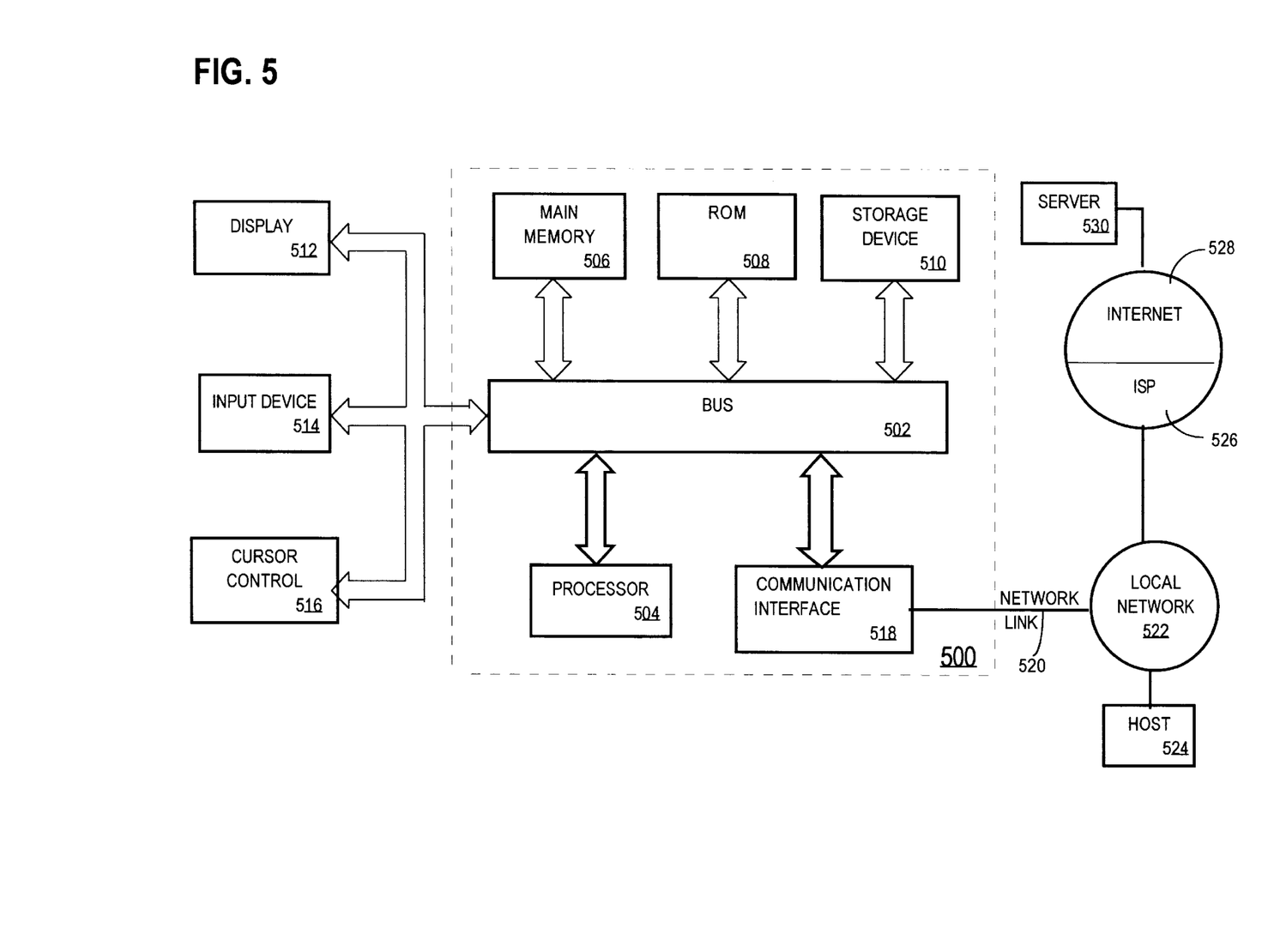
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for allowing users of Fortezza passwords to use computer networks with other authentication and authorization mechanisms. According to one embodiment of the invention, the allowing users of Fortezza passwords to use computer networks with other authentication and authorization mechanisms is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for allowing users of Fortezza passwords to use computer networks with other authentication and authorization mechanisms as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for receiving and authenticating a Fortezza password within a computer system that also receives and authenticates passwords of other types and to thereby selectively permit a client associated with the Fortezza password to access a network that is protected by the computer system, the method comprising the steps of:

receiving, from the client, user access information associated with a particular user of the client;

determining, based on the user access information and a database that contains profile information associated with the user, a password type associated with the user;

when the password type is FORTEZZA, requesting authentication of the password from a Fortezza server;

granting the client access to the network when the Fortezza server approves the password; and when the password type is any type other than FORTEZZA, requesting authentication of the password from an authentication process that is associated with that password type.

2. The method as recited in claim 1, wherein the step of receiving the user access information comprises the step of receiving, from the client, user access information associated with a particular user of the client at an access control server that is logically interposed between the client and the network.

3. The method as recited in claim 2 further comprising the step of receiving, from the client, user access information associated with a particular user of the client at a network access server that is coupled to the access control server and logically interposed between the client and the network.

4. The method of claim 1, wherein the step of determining the password type further comprises the step of accessing a user profile that is stored in the database and that stores profile information of a plurality of users, in which the profile information identifies users of FORTEZZA type passwords and passwords of other types.

5. The method as recited in claim 1, wherein the step of requesting authentication and authorization from the Fortezza server further comprises the step of communicating with the Fortezza server through a cryptologic library.

6. A computer-readable medium carrying one or more sequences of instructions for receiving and authenticating a Fortezza password within a computer system that also receives and authenticates passwords of other types and to thereby selectively permit a client associated with the Fortezza password to access a network that is protected by the computer system, wherein execution of the one or more sequences of instructions by one or more processors causes the one or more processors to perform the steps of:

receiving, from the client, user access information associated with a particular user of the client;

determining, based on the user access information and a database that contains profile information associated with the user, a password type associated with the user;

when the password type is FORTEZZA, requesting authentication of the password from a Fortezza server;

granting the client access to the network when the Fortezza server approves the password; and when the password type is any type other than FORTEZZA, requesting authentication of the password from an authentication process that is associated with that password type.

7. The computer-readable medium as recited in claim 6, wherein the step of receiving the user access information comprises the step of receiving, from the client, user access information associated with a particular user of the client at an access control server that is logically interposed between the client and the network.

8. The computer-readable medium as recited in claim 7 further comprising the step of receiving, from the client, user access information associated with a particular user of the client at a network access server that is coupled to the access control server and logically interposed between the client and the network.

9. The computer-readable medium of claim 6, wherein the step of determining the password type further comprises the step of accessing a user profile that is stored in the database and that stores profile information of a plurality of users, in which the profile information identifies users of FORTEZZA type passwords and passwords of other types.

10. The computer-readable medium as recited in claim 6, wherein the step of requesting authentication and authorization from the Fortezza server further comprises the step of communicating with the Fortezza server through a cryptologic library.

11. A password authentication apparatus configured to receive and authenticate a Fortezza password and to receive and authenticate passwords of other types, to thereby selectively permit a client associated with the Fortezza password to access a protected network, the apparatus comprising:

an access control server logically interposed between the client and the protected network;

a Fortezza authentication server coupled to the access control server for communication therewith;

a database coupled to the access control server and that contains profile information associated with the user;

means for generating the Fortezza password, coupled to the client;

means in the access control server for receiving, from the client, user access information associated with a particular user of the client; determining, based on the user access information and a database, a password type associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

12. The apparatus recited in claim 11, wherein the means in the access control server further comprises means for receiving, from the client, user access information associated with a particular user of the client at a network access server that is coupled to the access control server and logically interposed between the client and the network.

13. The apparatus of claim 11, wherein means in the access control server further comprises means for determining the password type by accessing a user profile that is stored in the database and that stores profile information of a plurality of users, in which the profile information identifies users of FORTEZZA type passwords and passwords of other types.

14. The apparatus as recited in claim 11, wherein the means in the access control server for requesting authentication and authorization from the Fortezza server further comprises a cryptologic library in the access control server that is logically coupled to the Fortezza server for communication therewith.

15. A password authentication apparatus configured to receive and authenticate a Fortezza password and to receive and authenticate passwords of other types, to thereby selectively permit a client associated with the Fortezza password to access a protected network, the apparatus comprising:

a Fortezza card reader coupled to the client and associated with a Fortezza card that contains the Fortezza password;

a network access server logically coupled to the client;

an access control server coupled logically between the client and the protected network and that controls access of the client to the protected network;

a Fortezza authentication server coupled to the access control server for communication therewith;

a database coupled to the access control server and that contains profile information associated with the user;

means in the access control server for receiving, from the client, user access information associated with a particular user of the client; determining, based on the user access information and a database, a password type associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

\* \* \* \* \*

UNITED STATES PATENT AND TRADEMARK OFFICE
CERTIFICATE OF CORRECTION

PATENT NO.    : 6,434,700 B1
DATED         : August 13, 2002
INVENTOR(S)   : Oscar Alonso et al.

It is certified that error appears in the above-identified patent and that said Letters Patent is hereby corrected as shown below:

Title page,
The title page should be deleted and replaced with the attached title page.

Drawings,
In the drawing sheets, replace printed FIG. 1 and FIG. 2 with the attached corrected FIG. 1 and FIG. 2.

Signed and Sealed this

Twelfth Day of November, 2002

Attest:

JAMES E. ROGAN
*Director of the United States Patent and Trademark Office*

*Attesting Officer*

(12) United States Patent
Alonso et al.

(10) Patent No.: US 6,434,700 B1
(45) Date of Patent: Aug. 13, 2002

(54) AUTHENTICATION AND AUTHORIZATION MECHANISMS FOR FORTEZZA PASSWORDS

(75) Inventors: Oscar S. Alonso, Westminster; John S. Calabrese, Mission Viejo; Herbert C. Morris, Hawthorne; Rodelito L. Victa, El Toro, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/218,730

(22) Filed: Dec. 22, 1998

(51) Int. Cl.[7] ................................................. G06F 1/26
(52) U.S. Cl. .................... 713/169; 713/168; 713/170; 713/176; 713/182
(58) Field of Search ................................ 713/168–169, 713/170, 176, 182

(56) References Cited

U.S. PATENT DOCUMENTS

| | | | | |
|---|---|---|---|---|
| 5,872,847 A | * | 2/1999 | Boyle et al. | 380/25 |
| 5,946,399 A | * | 8/1999 | Kitaj et al. | 380/49 |
| 6,067,620 A | * | 5/2000 | Holden et al. | 713/155 |
| 6,094,485 A | * | 7/2000 | Weinstein et al. | 380/30 |

* cited by examiner

*Primary Examiner*—Thomas R. Peeso
(74) *Attorney, Agent, or Firm*—Hickman Palermo Troung & Becker LLP (57) ABSTRACT

A method and apparatus that provide network access control are disclosed. In one embodiment, a network access control apparatus is configured to receive and authenticate a password that uses the "Fortezza" cryptographic protocol, and to receive and authenticate passwords of other types, to thereby selectively permit a client associated with the Fortezza password to access a protected network. A Fortezza card reader is coupled to the client and associated with a Fortezza card that contains the Fortezza password. A network access server is logically coupled to the client. An access control server is coupled logically between the client and the protected network and that controls access of the client to the protected network. A Fortezza authentication server is coupled to the access control server for communication therewith. A database is coupled to the access control server and that contains profile information associated with the user. The access control server receives, from the client, user access information associated with a particular user of the client; determining, based on the user access information and a database, a type of a password associated with the user; when the password type is FORTEZZA, requesting authentication of the password from a Fortezza server; granting the client access to the network when the Fortezza server approves the password; and when the password type is any type other than FORTEZZA, requesting authentication of the password from an authentication process that is associated with that password type.

15 Claims, 5 Drawing Sheets

FIG. 2